(12) United States Patent
Chiu et al.

(10) Patent No.: US 10,877,283 B1
(45) Date of Patent: Dec. 29, 2020

(54) LIGHT SOURCE MODULE

(71) Applicant: T.Q. OPTOELECTRONICS CO., LTD., Tainan (TW)

(72) Inventors: Huan-Ping Chiu, Tainan (TW); Ji-Pin Wang, Tainan (TW); Juergen Mueller, Berlin (DE); Gerald Uhlenberg, Berlin (DE)

(73) Assignee: T.Q. Optoelectronics Co., Ltd., Tainan (TW)

( * ) Notice: Subject to any disclaimer, the term of this patent is extended or adjusted under 35 U.S.C. 154(b) by 0 days.

(21) Appl. No.: 16/699,932

(22) Filed: Dec. 2, 2019

(51) Int. Cl.
  *G02B 27/09* (2006.01)
  *G02B 27/10* (2006.01)

(52) U.S. Cl.
  CPC ..... *G02B 27/0916* (2013.01); *G02B 27/1006* (2013.01)

(58) Field of Classification Search
  CPC ............ G02B 27/0916; G02B 27/1006; G02B 27/0905; G02B 27/10; G02B 27/141; G02B 27/145; G02B 27/146; G02B 21/208; G02B 21/2013; G02B 21/2033; F21W 2131/205; F21V 9/20; F21V 9/30; A61B 1/06; A61B 1/0646; A61B 1/0684; G03B 21/208; G03B 21/2013; G03B 21/2033
See application file for complete search history.

(56) References Cited

U.S. PATENT DOCUMENTS

| | | | | |
|---|---|---|---|---|
| 6,252,719 B1* | 6/2001 | Eichenbaum | ........ | G02B 27/145 359/634 |
| 8,733,948 B2* | 5/2014 | Ogawa | ...................... | F21V 9/00 353/94 |
| 8,967,811 B2* | 3/2015 | Jaffe | ........................ | F21V 9/083 353/31 |
| 9,942,528 B2* | 4/2018 | Akiyama | .............. | H04N 9/3114 |
| 10,560,639 B2* | 2/2020 | Ohashi | .................. | H04N 5/2351 |
| 2011/0222025 A1* | 9/2011 | Sakaguchi | .......... | G02B 27/0994 353/94 |
| 2018/0120682 A1* | 5/2018 | Gao | ...................... | G02B 27/102 |
| 2020/0103739 A1* | 4/2020 | Chang | .................. | G03B 21/204 |

* cited by examiner

*Primary Examiner* — Peggy A Neils
(74) *Attorney, Agent, or Firm* — Rosenberg, Klein & Lee

(57) ABSTRACT

The present invention provides a light source module. The first light source forms the first beam from the second light source, the third light source, and the function of the first beam splitter. Then the second beam splitter reflects the first beam and transmits the fourth beam from the fourth light source for forming the mixed beam, which is received and projected by the optical processing device. Thereby, by using the high color rendering and special optical properties of the mixed beam, the applications and efficacy of the present invention can be improved.

6 Claims, 5 Drawing Sheets

LIGHT SOURCE MODULE

FIELD OF THE INVENTION

The present invention relates generally to a light source module, and particularly to an optical module combining high color rendering and ultraviolet optical properties.

BACKGROUND OF THE INVENTION

The lighting device for an endoscope forms white light by using a plurality of light sources with various colors along with lenses and beam splitters. A single light source or a plurality of light sources excites phosphors and the excited light is mixed by lenses and beam splitters to form white light. Alternatively, a plurality of light sources are combined first before exciting phosphors and the excited light is mixed by lenses and beam splitters to form white light for endoscope equipment.

Unfortunately, the color rendering of the white light generated according to the prior art is generally inferior and unable to represent the real appearance of the shot object. In addition, for endoscope applications, in order to inspect if a patient's nidus (for example, the tissues, cells, or blood in a human body) appears abnormal using an endoscope, using simple white-light illumination is not sufficient for medical staff to judge the related symptoms. In other words, to show symptoms, a special light source is required before effective pathological information can be emerged. In addition to the color rendering problem, for special lighting applications, some drawbacks still need to be improved.

SUMMARY

An objective of the present invention is to provide a light source module, which combines a first beam (a mixed beam of red, blue, and ultraviolet beams) generated by a first light source and a fourth beam (a yellow beam) generated by a fourth light source to form a mixed white beam via the function of a second beam splitter. Thereby, the color rendering of the white light according to the prior art can be improved with special optical properties. Hence, the application efficiency of the light source module can be enhanced.

To achieve the above objective and efficacy, the present invention discloses a light source module, which comprises:

a first light source, including a first beam, and including:

- a second light source, including a second beam;
- a third light source, including a third beam;
- a first beam splitter, disposed on the path of the second beam and the third beam such that the second light source is disposed on one side of the first beam splitter and the third light source is disposed on the other side of the first beam splitter, transmitting the second beam and reflecting the third beam, and mixing the second beam and the third beam to form the first beam;

a fourth light source, including a fourth beam;

a second beam splitter, disposed on the path of the first beam and the fourth beam such that the first light source is disposed on one side of the second beam splitter and the fourth light source is disposed on the other side of the second beam splitter, reflecting the first beam and transmitting the fourth beam, and mixing the first beam and the fourth beam to form a mixed beam; and an optical processing device, disposed on the path of the mixed beam, shrinking gradually from one end to the other end, the one end receiving the mixed beam, and the other end projecting the mixed beam.

BRIEF DESCRIPTION OF THE DRAWINGS

FIG. 1 shows the schematic diagram 1 according to the first embodiment of the present invention;

FIG. 2 shows the schematic diagram 2 according to the first embodiment of the present invention;

FIG. 3 shows the schematic diagram 1 according to the second embodiment of the present invention;

FIG. 4 shows the schematic diagram 2 according to the second embodiment of the present invention; and FIG. 5 shows the schematic diagram according to the third embodiment of the present invention.

DETAILED DESCRIPTION

Please refer to FIG. 1. The present invention provides a light source, which comprises:

a first light source 1, including a first beam 10, and including:

- a second light source 12, including a second beam 120;
- a third light source 14, including a third beam 140;
- a first beam splitter 16, disposed on the path of the second beam 120 and the third beam 140 such that the second light source 12 is disposed on one side of the first beam splitter 16 and the third light source 14 is disposed on the other side of the first beam splitter 16, transmitting the second beam 120 and reflecting the third beam 140, and mixing the second beam 120 and the third beam 140 to form the first beam 10;

a fourth light source 4, including a fourth beam 40;

a second beam splitter 7, disposed on the path of the first beam 10 and the fourth beam 40 such that the first light source 1 is disposed on one side of the second beam splitter 7 and the fourth light source 4 is disposed on the other side of the second beam splitter 7, reflecting the first beam 10 and transmitting the fourth beam 40, and mixing the first beam 10 and the fourth beam 40 to form a mixed beam ML; and an optical processing device 9, disposed on the path of the mixed beam ML, shrinking gradually from one end to the other end, the one end receiving the mixed beam ML, and the other end projecting the mixed beam ML.

The optical processing device 9 includes a light-receiving part 90 and light-emitting part 92. One end of the light-receiving part 90 corresponds to the mixed beam ML and the other end thereof is connected to the light-emitting part 92. The optical processing device 9 shrinks gradually from the light-receiving part 90 to the light-emitting part 92. The light-receiving part 90 is used for receiving the mixed beam ML. The light-emitting part 92 is used for projecting the mixed beam ML.

Please refer to FIG. 2. The first beam splitter 16 includes a first surface 160 and a second surface 162. The second beam 120 is transmitted through the first surface 160 and the second surface 162, and mixed with the third beam 140 reflected by the second surface 162 to form the first beam 10. The second beam splitter 7 includes a third surface 70 and a fourth surface 72. The first beam 10 is reflected by the third surface 70. The fourth beam 40 is transmitted through the third surface 70 and the fourth surface 72, and mixed with the first beam 10 to form the mixed beam ML. The first beam 10 is a mixed beam including red, blue, and ultraviolet beams. The second beam 120 is a red beam. The third beam 140 is a mixed beam including blue and ultraviolet beams.

The fourth beam is the yellow light. The mixed beam ML is a mixed beam formed by white and ultraviolet beams.

Figure 1:
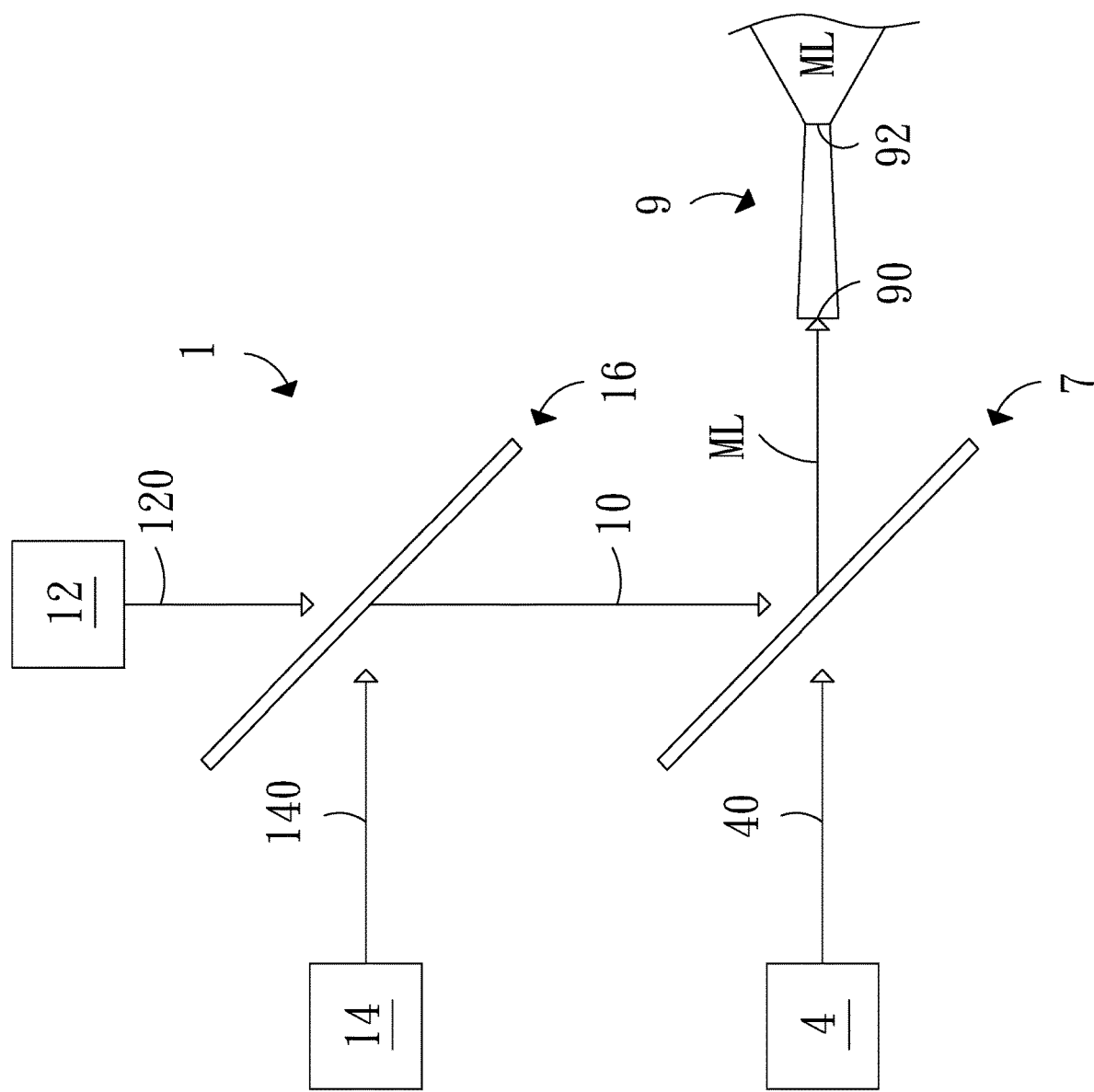
Figure 2:
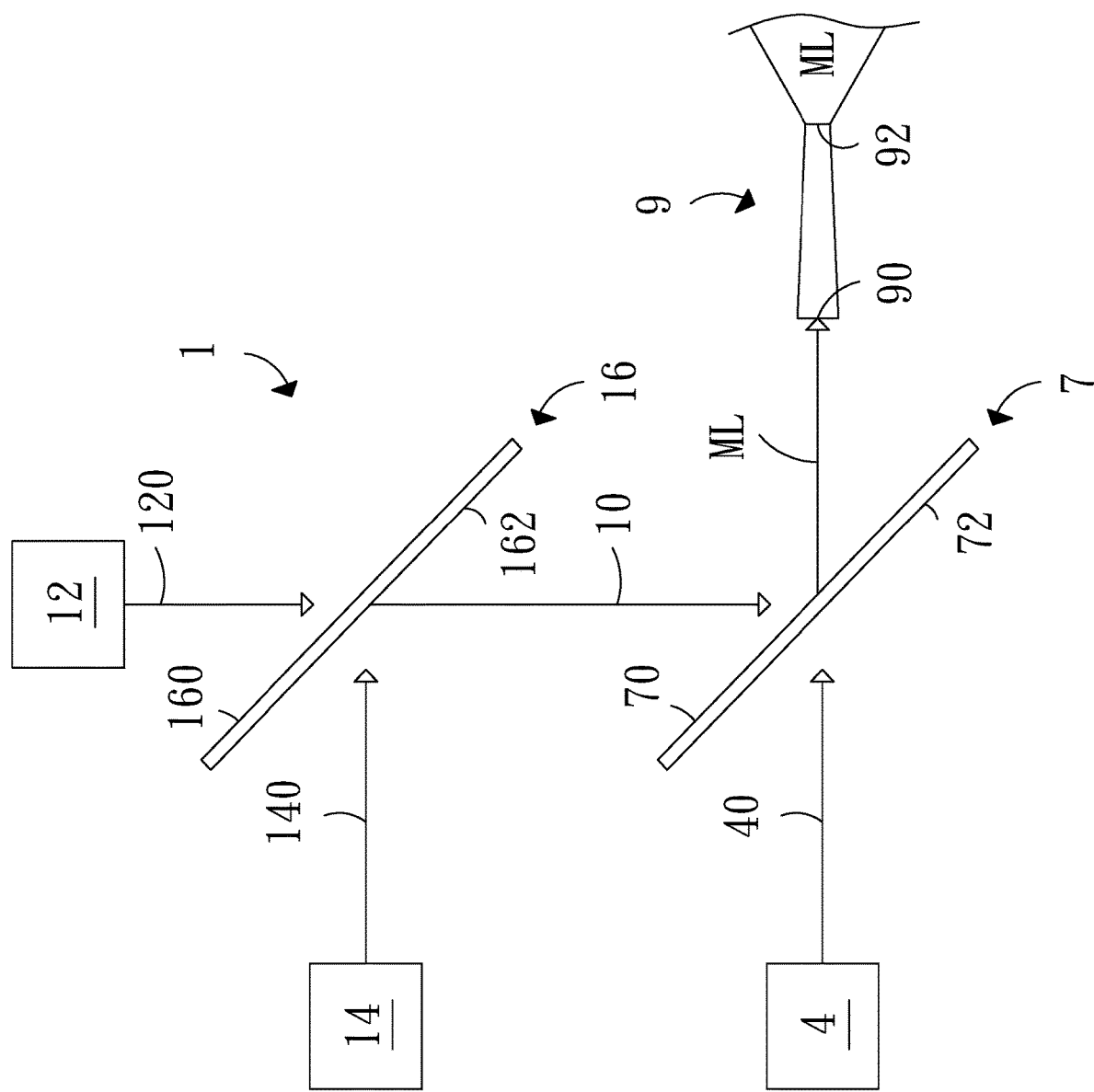

Please refer again to FIGS. 1 and 2. In the following, the operation of the present invention will be described. The first light source 1 and the fourth light source 4 can illuminate the second beam splitter 7 simultaneously or sequentially. First, the second light source 12 and the third light source 14 can illuminate the first beam splitter 16 simultaneously or sequentially. The second light source 12 and the third light source 14 project the second beam 120 and the third beam 140 to the first beam splitter 16, respectively. The third beam 140 is reflected by the second surface 162 to the direction of the second beam splitter 7. The second beam 120 is transmitted through the first surface 160 and the second surface 162 directly and mixed with the third beam 140 to form the first beam 120 traveling toward the direction of the second beam splitter 7. In other words, by using the above structure, the first beam 10 can be projected to the second beam splitter 7 for subsequent processing.

Next, the first light source 1 and the fourth light source 4 projects the first beam 10 and the fourth beam 40 to the second beam splitter 7. The first beam 10 is reflected by the third surface 70 and traveling toward the direction of the optical processing device 9. The fourth beam 40 is transmitted through the third surface 70 and the fourth surface 72 and traveling toward the direction of the optical processing device 9. Afterwards, by the function of the second beam splitter 7, the first beam 10 and the fourth beam 40 are mixed to form the mixed beam ML, which is then received and used by the optical processing device 9.

As an optical fiber, the light-receiving part 90 of the optical processing device 9 receives the mixed beam ML and then projects the mixed beam ML via the light-emitting part 92. By using the gradually shrinking structure (or the cone structure) of the optical processing device 9, the range for projecting the mixed beam ML from the light-emitting part 92 can be broader and hence increasing the observable range. For the endoscope according to the prior art, the size of examination equipment entering a human body is limited. Thereby, the observable range provide by the light projected by the optical processing device 4 is broader for medical staff and the illumination efficiency is enhanced as well. It is not required to change to the structure of endoscope equipment before a broader illumination is available.

Furthermore, the mixed beam ML improves the problem of inferior color rendering of white light according to the prior art. By mixing the first beam 10 and the fourth beam 40, the overall color rendering of white light can be enhanced. The light source module according to the present invention can act as the lighting device for endoscope equipment. Thanks to the high color rendering of the mixed beam ML, while illuminating the symptoms for diagnosis by medical staff, the real appearance of human body structures can be provided and thus preventing misjudgment by medical staff due to low color rendering. Besides, the first beam 10 includes the ultraviolet light, which enables the mixed beam ML to own the special optical properties provided by the ultraviolet light. Some special symptoms can be highlighted by the illumination of the mixed beam ML and avoiding ignorance by medial staff. Thereby, the solid pathological information can be acquired.

Figure 3:
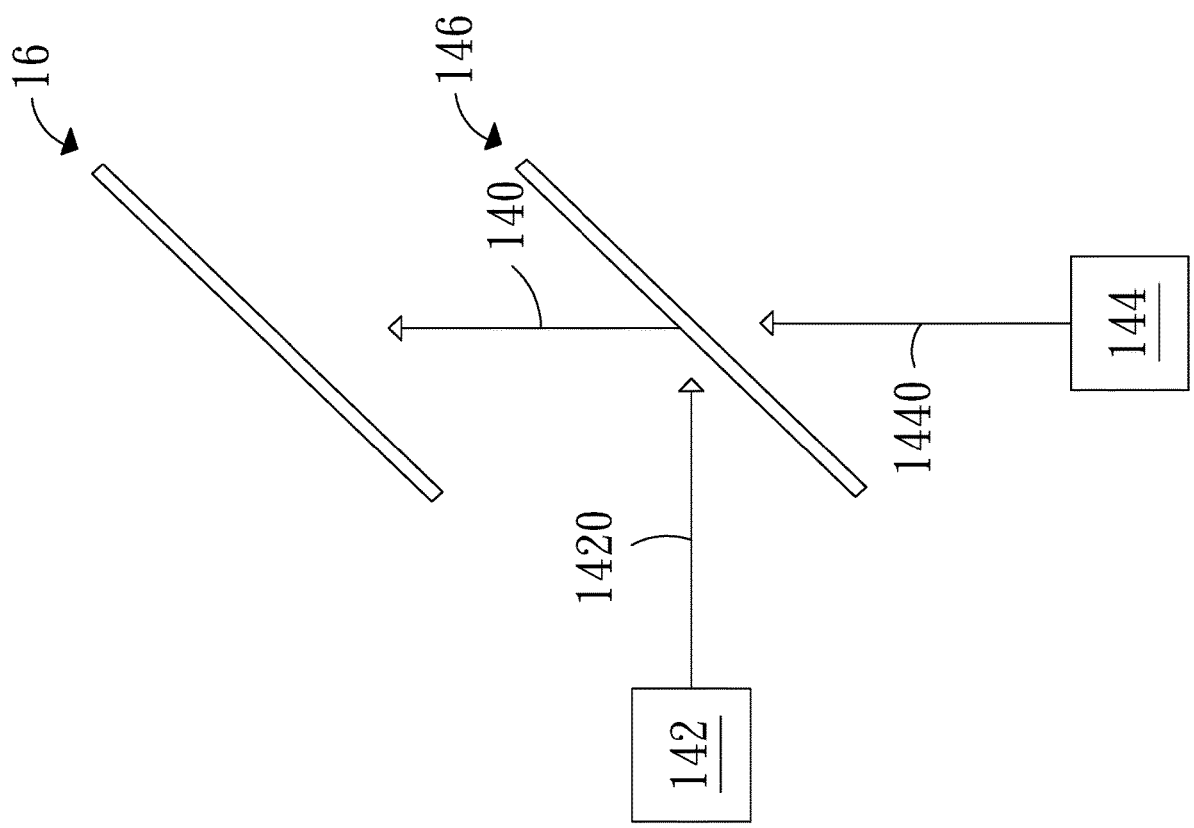
Figure 4:
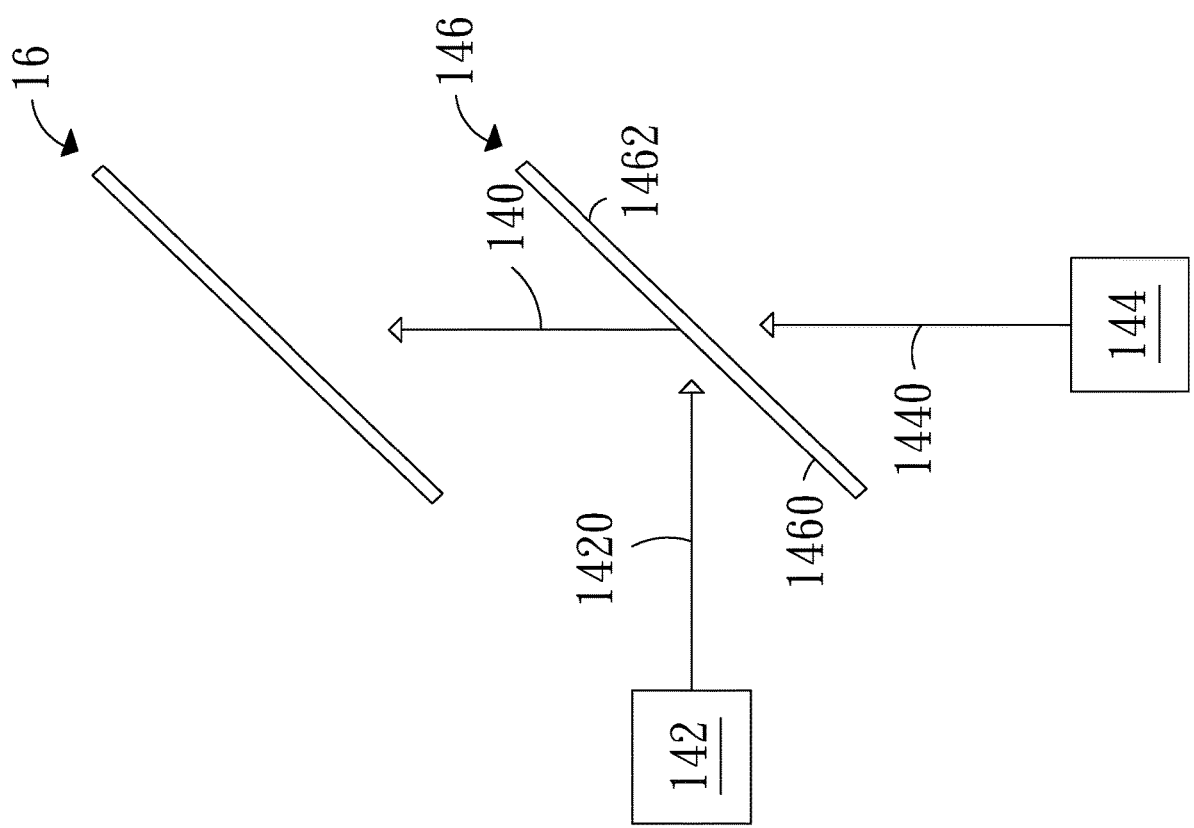

Please refer to FIGS. 3 and 4. The difference between the second embodiment and the first embodiment according to the present invention is that the third light source 14 according to the second embodiment includes a fifth light source 142, a sixth light source 144, and a third beam splitter 146. The fifth light source 142 includes a fifth beam 1420. The sixth light source 144 includes a sixth beam 1440. The third beam splitter 146 is disposed on the path of the fifth beam 1420 and the sixth beam 1440 such that the fifth light source 142 is disposed on one side of the third beam splitter 146 and the sixth light source 144 is disposed on the other side of the third beam splitter 146. The third beam splitter 146 reflects the fifth beam 1420 and transmits the sixth beam 1440 and hence mixing the fifth beam 1420 and the sixth beam 1440 to form the third beam 140.

The third beam splitter 146 includes a fifth surface 1460 and a sixth surface 1462. The sixth beam 1440 is transmitted through the fifth surface 1460 and the sixth surface 1462, and mixed with the fifth beam 1420 reflected by the fifth surface 1462 to form the third beam 140. The fifth beam 1420 is an ultraviolet beam. The sixth beam 1440 is a blue beam.

Regarding the mechanism of the third light source 14 according to the second embodiment, the fifth light source 142 and the sixth light source 144 can illuminate the third beam splitter 146 simultaneously or sequentially. The fifth light source 142 and the sixth light source 144 project the fifth beam 1420 and the sixth beam 1440 to the third beam splitter 146, respectively. The fifth beam 1420 is reflected by the fifth surface 1462 to the direction of the first beam splitter 16. The sixth beam 1440 is transmitted through the fifth surface 1460 and the sixth surface 1462 directly and mixed with the fifth beam 1420 to form the third beam 140 traveling toward the direction of the first beam splitter 16. In other words, by using the above structure according to the second embodiment of the present invention, the third beam 140 can be projected to the first beam splitter 16 for subsequent processing.

Figure 5:
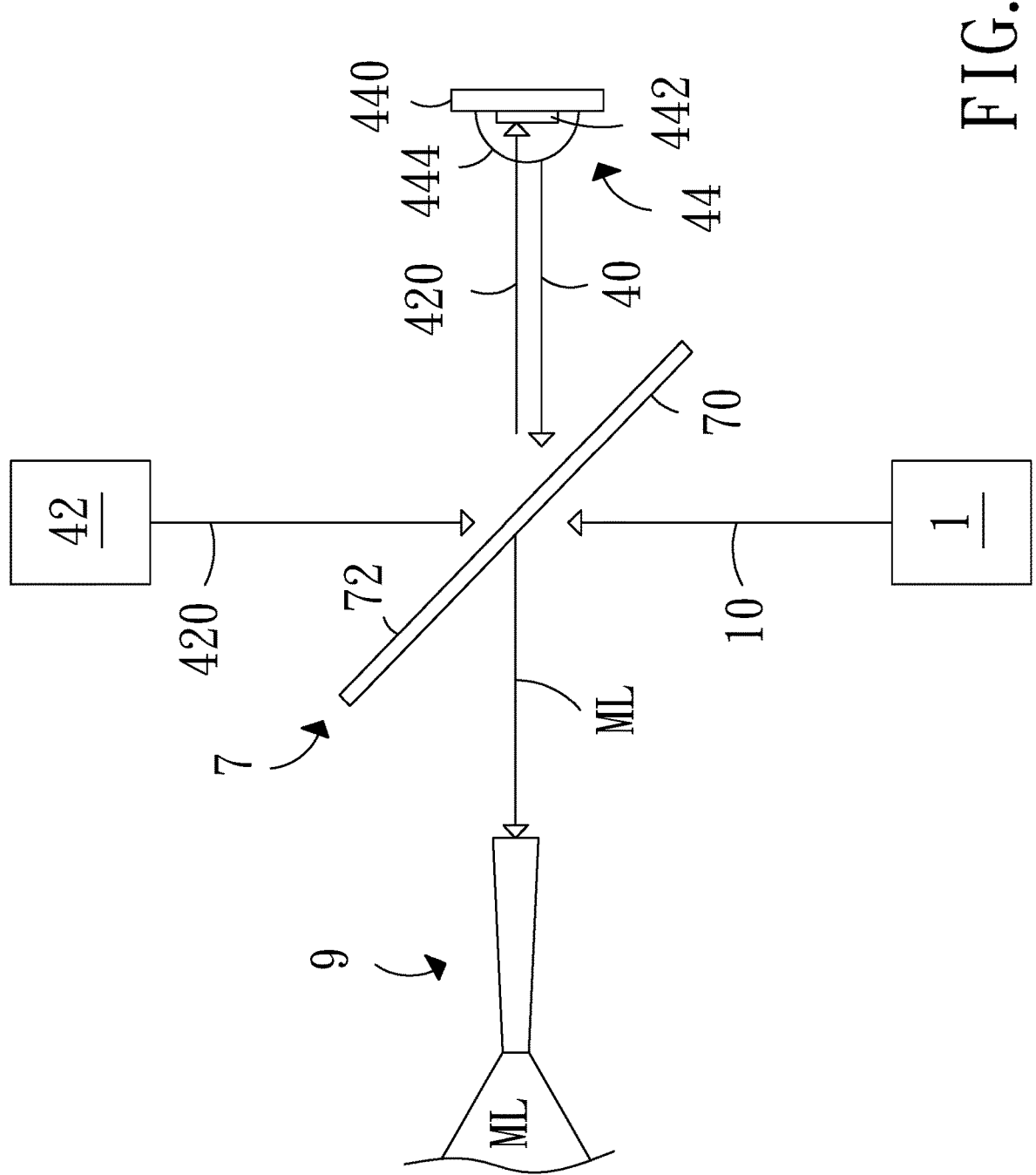

Please refer to FIG. 5. The difference between the third embodiment and the first embodiment is that the fourth light source 4 according to the third embodiment includes a seventh light source 42 and a fluorescent plate 44. The seventh light source 42 includes a seventh beam 420. The fluorescent plate 44 is disposed on the path on which the second beam splitter reflecting the seventh beam 420. The fluorescent plate 44 further includes a reflection mirror 440, a phosphor 442, and a light-concentrating lens 444. The phosphor 442 is disposed on one side of the reflection mirror 440. The second beam splitter 7 reflects the seventh beam 420 to travel toward the fluorescent plate 44. Then the seventh beam 420 is reflected by the phosphor 442 and the reflection mirror 442 to form the fourth beam 40. The light-concentrating lens 444 is disposed on one side of the reflection mirror 440 and the phosphor 442 for covering the phosphor 442 and concentrating the light (the seventh beam 420) projecting to the fluorescent plate 44 to the phosphor 442.

The seventh beam 420 is a blue beam formed by the matrix of a plurality of laser beams. The phosphor 442 is yellow fluorescent powders. The material of the phosphor 442 contained in the fluorescent plate 44 can be any material excitable by the seventh beam 420 and forming the fourth beam 40 (yellow beam). Preferably, the phosphor 442 is, but not limited to, yellow powders.

According to the third embodiment, the mechanism of second beam splitter 7 on the first beam 10 is identical to the mechanism on the fourth beam 40. Hence, the generation of the fourth beam 40 is taken as an example. The fourth beam 40 is generated by the seventh beam 420 from the seventh light source 42 reflected by the fourth surface 72, and reflected and excited by the fluorescent plate 44. The fourth beam 40 is reflected and traveling toward the second beam splitter 7. After being transmitted through the third and fourth surfaces 70, 72, the fourth beam 40 travels toward the optical processing device 9. Afterwards, the first beam 10 and the fourth beam 40 are mixed by the second beam splitter 7 to form the mixed beam ML, which is then received and used by the optical processing device 9.

According to the above embodiments, the light sources (the first to the seventh) can be disposed according to the illumination requirements. It is not limited to adopt a plurality of laser beams or light-emitting diodes (LED) arranged in a matrix or a single laser beam or LED. In addition, the beam splitters (the first to the third) are designed to allow direct transmission by the light with a specific wavelength and to reflect the light with another specific wavelength and thus projecting or transmitting light to other devices. They are changed according to design requirements and light sources. Moreover, the second light source 12, the fifth light source 142, and the sixth light source 144 are interchangeable. For example, the second light source 12 can be disposed on one side of the third beam splitter 146. The fifth light source 142 can be disposed on one side of the first beam splitter 16. Then the fifth surface 1460 of the third beam splitter 146 can reflect the second beam 120 to travel toward the first beam splitter 16. Meanwhile, the first surface 160 and the second surface 162 of the first beam splitter 16 can transmit the fifth beam 1420 directly to travel toward the second beam splitter 7.

What is claimed is:

1. A light source module, comprising:
    a first light source, including a first beam, and including:
        a second light source, including a second beam;
        a third light source, including a third beam; and
        a first beam splitter, disposed on the path of said second beam and said third beam such that said second light source is disposed on one side of said first beam splitter and said third light source is disposed on the other side of said first beam splitter, transmitting said second beam and reflecting said third beam, and mixing said second beam and said third beam to form said first beam;
    a fourth light source, including a fourth beam;
    a second beam splitter, disposed on the path of said first beam and said fourth beam such that said first light source is disposed on one side of said second beam splitter and said fourth light source is disposed on the other side of said second beam splitter, reflecting said first beam and transmitting said fourth beam, and mixing said first beam and said fourth beam to form a mixed beam; and
    an optical processing device, disposed on the path of said mixed beam, shrinking gradually from one end to the other end, said one end receiving said mixed beam, and said other end projecting said mixed beam;
    wherein said second beam is a red beam, said third beam is mixed of blue beam and ultraviolet beam, said fourth beam is a yellow beam; said mixed beam is mixed of white beam and ultraviolet beam.

2. The light source module of claim 1, wherein said first beam splitter includes a first surface and a second surface; and said second beam is transmitted through said first surface and said second surface, and then mixed with said third beam reflected by said second surface to form said first beam.

3. The light source of claim 1, A light source module, comprising:
    a first light source, including a first beam, and including:
        a second light source, including a second beam;
        a third light source, including a third beam; and
        a first beam splitter, disposed on the path of said second beam and said third beam such that said second light source is disposed on one side of said first beam splitter and said third light source is disposed on the other side of said first beam splitter, transmitting said second beam and reflecting said third beam, and mixing said second beam and said third beam to form said first beam;
    a fourth light source, including a fourth beam;
    a second beam splitter, disposed on the path of said first beam and said fourth beam such that said first light source is disposed on one side of said second beam splitter and said fourth light source is disposed on the other side of said second beam splitter, reflecting said first beam and transmitting said fourth beam, and mixing said first beam and said fourth beam to form a mixed beam; and
    an optical processing device, disposed on the path of said mixed beam, shrinking gradually from one end to the other end, said one end receiving said mixed beam, and said other end projecting said mixed beam;
    wherein said second beam is a red beam, said third beam is mixed of blue beam and ultraviolet beam, said fourth beam is a yellow beam;
    said mixed beam is mixed of white beam and ultraviolet beam; said third light source includes:
        a fifth light source, including a fifth beam;
        a sixth light source, including a sixth beam; and
        a third beam splitter, disposed on the path of said fifth beam and said sixth beam such that said fifth light source is disposed on one side of said third beam splitter and said sixth light source is disposed on the other side of said third beam splitter, reflecting said fifth beam and transmitting said sixth beam, and mixing said fifth beam and said sixth beam to form said third beam, said fifth beam is an ultraviolet beam and said sixth beam is a blue beam.

4. The light source module of claim 1, wherein said second beam splitter includes a third surface and a fourth surface; said first beam is reflected by said third surface; and said fourth beam is transmitted through said third surface and said fourth surface, and mixed with said first beam to form said mixed beam.

5. A light source module, comprising:
    a first light source, including a first beam, and including:
        a second light source, including a second beam;
        a third light source, including a third beam; and
        a first beam splitter, disposed on the path of said second beam and said third beam such that said second light source is disposed on one side of said first beam splitter and said third light source is disposed on the other side of said first beam splitter, transmitting said second beam and reflecting said third beam, and mixing said second beam and said third beam to form said first beam;
    a fourth light source, including a fourth beam;
    a second beam splitter, disposed on the path of said first beam and said fourth beam such that said first light source is disposed on one side of said second beam splitter and said fourth light source is disposed on the other side of said second beam splitter, reflecting said first beam and transmitting said fourth beam, and mixing said first beam and said fourth beam to form a mixed beam; and
    an optical processing device, disposed on the path of said mixed beam, shrinking gradually from one end to the other end, said one end receiving said mixed beam, and said other end projecting said mixed beam;

wherein said second beam is a red beam, said third beam is mixed of blue beam and ultraviolet beam, said fourth beam is a yellow beam; said mixed beam is mixed of white beam and ultraviolet beam; said fourth light source includes:
- a seventh light source, including a seventh beam; and
- a fluorescent plate, disposed on the path on which said second beam splitter reflecting said seventh beam, including a light-concentrating lens, a reflection mirror and a phosphor, said phosphor being disposed on one side of said reflection mirror, said light-concentrating lens disposed on one side of said reflection mirror and said phosphor to cover said phosphor, said second beam splitter reflecting said seventh beam to travel toward said fluorescent plate, and then said seventh beam being reflected by said phosphor and said reflection mirror to form said fourth beam;
- wherein said seventh beam is a blue beam formed by the matrix of a plurality of laser beams generated by said seventh light source; and said phosphor is yellow fluorescent powders.

6. The light source module of claim 3, wherein said third beam splitter includes a fifth surface and a sixth surface; and said sixth beam is transmitted through said fifth surface and said sixth surface, and then mixed with said fifth beam reflected by said fifth surface to form said third beam.

\* \* \* \* \*